Figure 1:
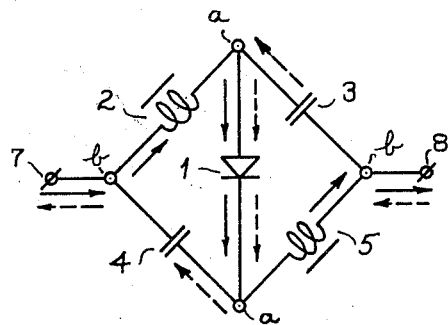

Oct. 29, 1963  G. INDUNI  3,109,134
OVERVOLTAGE PROTECTION FOR ELECTRIC VALVES
Filed March 30, 1961

INVENTOR

Giovanni Induni

BY Pierce, Schiffler & Parker
ATTORNEYS

United States Patent Office 3,109,134
Patented Oct. 29, 1963

3,109,134
OVERVOLTAGE PROTECTION FOR
ELECTRIC VALVES
Giovanni Induni, Nussbaumen, Aargau, Switzerland, assignor to Aktiengesellschaft Brown, Boveri & Cie, Baden, Switzerland, a joint-stock company
Filed Mar. 30, 1961, Ser. No. 99,540
Claims priority, application Switzerland Apr. 2, 1960
3 Claims. (Cl. 321—11)

This invention relates generally to protective systems for electric semi-conductor or one-way valves and more particularly to an improved arrangement for protecting the valves against overvoltages, and especially in the blocking direction of the valve. The object of the invention is to obtain the desired protective effect by automatically guiding the overvoltages, regardless of their direction, in such a manner that they impinge on the valve in its passing direction.

Overvoltages may be produced in various ways, by disconnections, by resonances in the network, or also by charging processes in the valve itself. They are particularly dangerous for the valves when they impinge in the blocking direction thereof. In this case, each valve must be able to sustain a certain voltage. Normally this is the applied voltage. For reasons of safety the valves are so designed that they will withstand without damage still somewhat higher voltages. In particular for valves of the semi-conductor type, however, this additional safety is but small. In the passing direction, no especially high voltages occur at the terminals of the valves as they themselves represent a small resistance. But even in this case, overvoltage can damage the valves, in particular when they exhibit very steep wave fronts.

Various measures have become known to keep these undesired overvoltages away from the valve. Condensers which represent a small resistance for steep voltage wave fronts have been connected in parallel, or overvoltage diverters have been provided which in conjunction with voltage-dependent resistances have a smaller resistance value at higher voltages than at the operating voltage. Also, inductances have been connected before the valves which flatten the wave front of the arriving overvoltage, thus making it less dangerous. All these measures have the disadvantage that they are not in all cases operative in the same manner. Internal overvoltages cannot be flattened by the preconnected inductances, but may even be intensified by reflections, whereas, external overvoltages can be rendered harmless with inductances. Overvoltage diverters do not act in the same manner in both directions as they themselves possess a valve effect. Condensers are not effective when overvoltages occur in passing direction because then the valve itself has a smaller resistance than the condenser.

In order now to reduce, to an amount harmless to the valves, all kinds of overvoltages which arise due to internal and external processes, it is proposed according to the invention to arrange the valves in the bridge i.e. across a diagonal of a bridge circuit consisting of condensers and inductances opposed in pairs.

It is thereby achieved that the overvoltages always go through the valves in passing direction and that the inductances are operative precisely when the overvoltage itself occurs in the same direction as the voltage to be rectified, and the capacities are operative when the overvoltage is directed oppositely.

Figure 2:
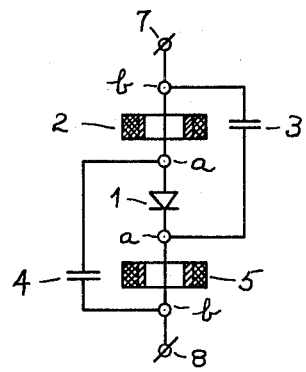

In the drawings which represent one embodiment of the invention:

FIG. 1 is an electrical circuit diagram showing the valve to be protected arranged in the bridge circuit; and FIG. 2 is a similar view but showing the details of construction for the inductances which are connected in one pair of opposite arms of the bridge.

With reference now to the drawings, the one-way valve to be protected is indicated at 1, and it will be seen that it is connected across one diagonal a—a of a bridge circuit. The input and output terminals 7, 8 for the circuit in which the valve is connected are connected across the other diagonal b—b of the bridge. The bridge itself is composed of a pair of inductances 2 and 5 connected respectively in one pair of opposite arms of the bridge, and a pair of condensers 3 and 4 connected respectively in the other pair of opposite arms of the bridge. The operating current flow through the circuit is from input terminal 7 through inductance 2, valve 1 and inductance 5 to output terminal 8. An overvoltage arriving in the same direction follows the same path. Because of the inductances 2, 5 its wave front is flattened and the overvoltage reduced to a permissible amount. But if an overvoltage comes from terminal 8 arriving in the opposite direction, also in the blocking direction of the valve, it must go over the condensers 3 and 4 and thus, likewise reaches valve 1 in passing direction because the branch paths with the inductances have a much higher resistance because of the blocking effect of the valve than the branch paths with the capacities. Therefore, the overvoltage can likewise go through the valve in passing direction. In FIG. 1 the direction of the overvoltages is indicated by arrows; the arrows in solid lines designate the path of the overvoltage in the passing direction of the valve 1. The arrows in broken lines indicate the path of an overvoltage arriving in blocking direction.

FIG. 2 shows an example of construction of the inventive concept. The inductances 2 and 5 are formed by iron ring like cores which are slipped over the lead-in wire of valve 1. These iron rings may consist of material having a high permeability characteristic. The condensers 3 and 4 are connected in parallel with the main circuit. In this way valve 1 lies, as in FIG. 1, in the bridge i.e. across the diagonal points of a bridge circuit consisting of inductances and condensers.

The advantage of the described arrangement is that for all cases of overvoltages an effective protection of the valve exists and in every case the overvoltage is conducted over the valve in passing direction.

I claim:
1. An overvoltage protective arrangement for electrical one-way valves comprising a bridge circuit, said bridge circuit having inductances connected respectively in one pair of opposite arms of the bridge and condensers connected respectively in the other pair of opposite arms of the bridge, a one-way electrical valve connected across one diagonal of the bridge, and input and output terminals for the valve circuit connected at the other diagonal of the bridge.
2. An overvoltage protective arrangement as defined in claim 1 wherein said inductances are composed of iron rings surrounding conductors leading to said valve, said conductors constituting the inductance arms of said bridge.
3. An overvoltage protective arrangement as defined in claim 2 wherein said iron rings are made from a material having a high permeability characteristic.

References Cited in the file of this patent
UNITED STATES PATENTS
2,895,100    Filberich et al. _____ July 14, 1959